United States Patent
Balland et al.

(10) Patent No.: US 9,221,010 B2
(45) Date of Patent: Dec. 29, 2015

(54) TWO-STEP PROCESS FOR THE CLEANING OF A FLUE GAS

(75) Inventors: Jean-Pascal Balland, Brussels (BE); Jean-Manuel Janiszewski, Paris (FR)

(73) Assignee: SOLVAY SA, Brussels (BE)

( * ) Notice: Subject to any disclaimer, the term of this patent is extended or adjusted under 35 U.S.C. 154(b) by 940 days.

(21) Appl. No.: 13/424,061

(22) Filed: Mar. 19, 2012

(65) Prior Publication Data

US 2012/0244054 A1    Sep. 27, 2012

Related U.S. Application Data

(60) Provisional application No. 61/454,739, filed on Mar. 21, 2011.

(51) Int. Cl.
| | | |
|---|---|---|
| B01D 53/40 | (2006.01) | |
| B01D 53/50 | (2006.01) | |
| B01D 53/83 | (2006.01) | |

(52) U.S. Cl.
CPC .............. *B01D 53/508* (2013.01); *B01D 53/83* (2013.01); *B01D 2251/304* (2013.01); *B01D 2251/606* (2013.01); *B01D 2257/302* (2013.01); *B01D 2258/0233* (2013.01); *B01D 2259/128* (2013.01)

(58) Field of Classification Search
None
See application file for complete search history.

(56) References Cited

U.S. PATENT DOCUMENTS

| | | |
|---|---|---|
| 6,171,567 B1 | 1/2001 | Fagiolini |
| 7,481,987 B2 | 1/2009 | Maziuk, Jr. |
| 7,854,911 B2 | 12/2010 | Maziuk, Jr. |
| 2011/0014106 A1 | 1/2011 | Pfeffer et al. |

FOREIGN PATENT DOCUMENTS

| | | |
|---|---|---|
| IT | 1306648 B1 | 10/2001 |
| WO | WO 2010049534 A1 | 5/2010 |

*Primary Examiner* — Stuart Hendrickson
*Assistant Examiner* — Daniel Berns
(74) *Attorney, Agent, or Firm* — Beatrice C. Ortego

(57) ABSTRACT

A two-step process for the cleaning of a stream of flue gas, containing noxious acidic compounds, by means of a quantity of basic sodium reagent, wherein the quantity of basic sodium reagent is injected in a secondary stream diverted from the main stream wherein it reacts in a first step with the noxious acidic compounds contained in the secondary stream during a pre reaction period, resulting in pre-reacted basic reagent, un-reacted basic reagent and partially cleaned secondary stream of flue gas; and wherein after the pre reaction period, the partially cleaned secondary stream comprising the quantity of pre reacted basic sodium reagent is reintroduced in the main stream, the pre-reacted reagent and un-reacted reagent further reacting in a second step with at least part of the remaining noxious acids left in the partially cleaned secondary stream of flue gas.

11 Claims, 1 Drawing Sheet

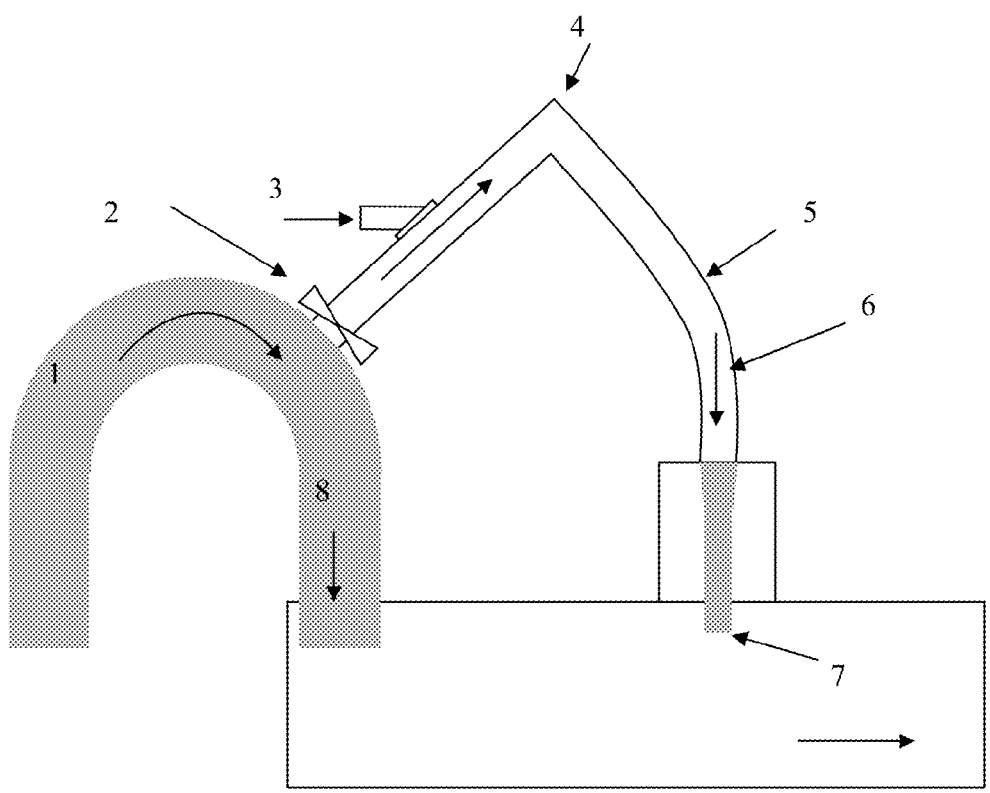

TWO-STEP PROCESS FOR THE CLEANING OF A FLUE GAS

CROSS-REFERENCE TO RELATED APPLICATIONS

This application claims priority to U.S. provisional application No. 61/454,739, filed on Mar. 21, 2011, the whole content of this application being incorporated herein by reference for all purposes.

TECHNICAL FIELD OF THE INVENTION

The invention relates to the cleaning of flue gases, more particularly to the cleaning of flue gases containing noxious acidic compounds by means of a basic sodium reagent, examples of such gases being the fumes originating from the combustion of fossil fuels, from the incineration of household or hospital waste, or from the industrial processes like processes for the production of cement.

BACKGROUND

Examples of noxious acidic compounds are HCl, $NO_x$, $SO_2$, $SO_3$.

$SO_3$, for example, is a noxious gas that is produced from the combustion of sulfur-containing fuel. When present in flue gas, the $SO_3$ can form an acid mist that condenses in electrostatic precipitators, ducts or bag houses, causing corrosion. $SO_3$ at concentrations as low as 5-10 ppm in exhaust gas can also result in white, blue, purple, or black plumes from the cooling of the hot stack gas in the cooler air in the atmosphere.

Sodium bicarbonate in powder form is a known basic sodium reagent for cleaning gases of acidic compounds. It finds application in particular for cleaning fumes of oxides of sulphur, of oxides of nitrogen (especially of nitric oxide) and of hydrogen halides of general formula HX (in particular, of hydrogen fluoride and of hydrogen chloride). Fumes of this kind are commonly generated by the incineration of domestic refuse or hospital waste and by the combustion of fuels of fossil origin, especially in electricity-producing power stations.

In these applications, the gas to be cleaned is contacted with the sodium bicarbonate in the form of a finely ground powder at a temperature which is generally between 120 and 250° C. After reaction of the reagent, the flue gas is submitted to a separation in order to separate the reacted reagent from the cleaned flue gas. Separation is frequently operated by means of baghouse filters or electrostatic separators. A flue gas cleaning process based on dry injection of a finely ground powder of sodium bicarbonate is disclosed in EP0740577 (SOLVAY SA).

Sodium sesquicarbonate in powder form is another known basic sodium reagent for cleaning gases of acidic compounds. Sodium sesquicarbonate is commonly used in the form on trona. Trona is a mineral that contains about 85-95% sodium sesquicarbonate ($Na_2CO_3 \cdot NaHCO_3 \cdot 2H_2O$). A vast deposit of mineral trona is found in southwestern Wyoming near Green River. Flue gas cleaning processes based on dry injection of a finely ground powder of trona and subsequent separation of reacted trona are disclosed for instance in U.S. Pat. No. 7,854,911 and U.S. Pat. No. 7,481,987 (SOLVAY CHEMICALS, Inc.).

In those known flue gas cleaning processes, the temperature of the flue gas wherein the basic sodium reagent is introduced is advantageously above critical values, in order for the sodium reagent to have optimal reactivity.

In many situations however, injection into flue gases of very high temperatures creates difficulties during the separation step of the reacted reagents, in view of the required higher thermal resistance of the separators.

US2011/0014106 discloses a flue gas treatment process wherein sodium bicarbonate is pre-calcined, preferably in a fluid bed, before injection in the flue gas.

In IT1306648 is disclosed a process for the cleaning of a flue gas having a temperature below 140° C., wherein sodium bicarbonate is submitted to a thermal treatment in order to decompose it into sodium carbonate, which is thereafter injected into the flue gas.

Those processes have however several disadvantages. The thermal treatment consumes energy and/or requires a separate equipment. Moreover, the handling of the sodium carbonate produced in the thermal treatment is difficult in order to avoid a severe loss of performance.

SUMMARY OF THE INVENTION

The invention aims at solving those problems and aims to deliver a process for the cleaning of a flue gas which is cost effective, more efficient and avoids submitting the separators to high thermal stresses.

Consequently, the invention concerns a two-step process for the cleaning of a stream of flue gas, containing noxious acidic compounds, by means of a quantity of basic sodium reagent, wherein the flow path of the stream of flue gas comprises a bypass point and a reintroduction point;

the stream of the flue gas is separated at the bypass point into a bypass secondary flue gas stream and a main flue gas stream, the bypass secondary stream being at most 50% in weight of the main stream;

the quantity of basic sodium reagent is injected in the bypass secondary bypass stream wherein it reacts in a first step with the noxious acidic compounds contained in the bypass secondary flue gas stream during a pre-reaction period, resulting in pre-reacted basic reagent, un-reacted basic reagent and partially cleaned secondary stream of flue gas;

the temperature of the bypass secondary flue gas stream at the basic sodium reagent injection point is at least 50° C. higher than the temperature of the main flue gas stream at the reintroduction point; and wherein after the pre-reaction period, the partially cleaned secondary stream comprising the quantity of pre reacted basic sodium reagent and un-reacted reagent is reintroduced in the main flue gas stream at the reintroduction point, the pre-reacted reagent and un-reacted reagent then further reacting in a second step with at least part of the noxious acidic compounds contained in the main stream of the flue gas and at least part of the noxious acidic compounds left in the partially cleaned secondary stream of flue gas, resulting in reacted reagent and cleaned flue gas.

BRIEF DESCRIPTION OF THE DRAWINGS

For a detailed description of preferred embodiments of the invention, reference will now be made to the accompanying drawing, in which:

FIG. 1 illustrates a particular embodiment of the process of the present invention.

DETAILED DESCRIPTION OF THE PREFERRED EMBODIMENTS

In the process according to the invention the basic sodium reagent is generally a powder of solid particles. It is injected in a diverted part of the flue gas to be cleaned where it operates a first cleaning and afterwards is reintroduced with the diverted part in the main stream wherein it completes its reaction and cleaning. As a result, the reagent never cools down completely. Its temperature remains preferably above the minimum temperature of the flue gas during its cleaning. The basic sodium reagent remains indeed in contact with the flue gas to be cleaned during the whole cleaning process.

In particular, during the pre-reaction period, the basic sodium reagent should remain in contact with the flue gas in the secondary stream for a time sufficient for at least 5%, preferably at least 10%, more preferable at least 15% and most preferably at least 20% of the basic reagent to have reacted with noxious acidic compounds. During this pre-reaction period it is advantageous that the basic sodium reagent circulates in a duct comprising turbulence promoters, enhancing global mixing of the reagent with the flue gas.

At the end of the cleaning process, the reacted reagent is advantageously separated from the cleaned flue gas. When the basic sodium reagent is a powder of solid particles, the removal step is generally performed by use of a filter such as a bag filter or by use of electrostatic precipitators.

The basic sodium reagent is preferably a powder of particles having mean $D_m$ diameters less than 15 μm. The mean diameter of the particles of the powder is defined by the equation:

$$D_m = \frac{\sum n_i D_i}{\sum n_i}$$

in which $n_i$ denotes the frequency (by weight) of the particles of diameter $D_i$. These particle size parameters are defined by the laser scattering analysis method using a MASTERSIZER S measurement instrument manufactured by Malvern, used in wet mode with the MS17 DIF 2012 accessory.

The basic sodium reagent is also preferably a powder of particles having a particle size slope of less than 5, preferably less than 3, the particle size slope a being defined by the equation:

$$\sigma = \frac{D_{90} - D_{10}}{D_m},$$

in which $D_{90}$ (and $D_{10}$) represent, respectively, the diameter for which 90% and 10%, respectively, of the particles of the powder (expressed by weight) have a diameter of less than $D_{90}$ and $D_{10}$, respectively. These particle size parameters are defined by the laser scattering analysis method using a measurement apparatus such as those described above.

The $D_{90}$ diameter is advantageously lower than 20 μm, preferably lower than 16 μm. Preferred particle sizes for the powder injected into the flue gas correspond to a mean particle diameter of 5 to 30 μm, a particle size slope of 1 to 3 and $D_{90}$ diameter less than 16 μm. Further information regarding the optimum particle size parameters can be obtained from the patent EP 0 740 577 B1 mentioned above [SOLVAY (Société Anonyme)], incorporated herein by reference.

Such particle size optimum parameters can advantageously be obtained by milling the basic sodium reagent in a process in which a cleaning agent is mixed with the basic sodium reagent and the mixture is introduced into a mill, preferably an impact mill, for the purpose of obtaining a powder with a mean diameter comprised between 5 and 30 μm and of inhibiting the formation of incrustations in the mill, the cleaning agent being selected from zeolites, dolomite, magnesium hydroxycarbonate, lime, hydrocarbons, talc, fatty acids, and fatty acid salts.

The basic sodium reagent is advantageously sodium bicarbonate, sodium sesquicarbonate, or trona.

In the process according to the invention, the temperature of the secondary flue gas at the basic sodium reagent injection point is at least 25° C., generally at least 50° C., often at least 75° C. and in some instances at least 100° C. higher than the temperature of the flue gas at the reintroduction point.

The injection of the basic sodium reagent can in some instances be performed advantageously by a device comprising a pipe provided with at least one inlet orifice and with a series of outlet orifices spread along the pipe and placed in the side wall of this pipe, the pipe having an open downstream end, acting as supplementary outlet orifice whose diameter is less than the diameter of the pipe, at least one section of the wall of the pipe, located downstream of at least one outlet orifice and limited by a section of the edge of this orifice, having a shape such that this section of the edge of this orifice is positioned inside the pipe so that, when the device is in service, the flow direction of the fluid exiting this orifice and travelling along said wall section, is controlled by the shape of the latter section. Details and explanations on this device can be found in WO2010/049534 (SOLVAY SA), incorporated herein by reference.

In the process according to the invention, the injection of at least part of the quantity of the basic sodium reagent in the bypass stream can be performed in a single point or at multiple points. In the latter case, use of several devices according to WO 2010/049534 is recommended.

The at least part of the quantity of the basic sodium reagent accounts for at least 50% in weight, preferably at least 75%, more preferably at least 90%, most preferably 100% in weight of the quantity of sodium reagent used for the cleaning of the stream of flue gas.

The at least part of the quantity of sodium reagent, injected in the bypass stream, must be sufficient to achieve effective cleaning of the stream of flue gas. It is recommended to achieve SRT values (as defined below) of at least 0.1, preferably at least 0.2.

The process according to the invention is well suited to the case wherein the basic sodium reagent is sodium bicarbonate. It is also well suited to temperatures of the flue gas at the reintroduction point being lower than 140° C.

Should the disclosure of any patents, patent applications, and publications which are incorporated herein by reference conflict with the description of the present application to the extent that it may render a term unclear, the present description shall take precedence.

The following examples and the annexed FIGURE illustrate a particular embodiment of the invention.

EXAMPLES

Examples 1 to 3 and Comparative Examples 1 to 3

In all the examples and as represented in FIG. 1, a stream of flue gas (1) having a flow rate of 117,000 Nm³/h and a temperature of 300° C., originating from an industrial cement production plant, was separated at the bypass point (2) into a bypass secondary stream (6) having a flow rate of 3,000 Nm³/h flowing into the duct (5) and a remaining main stream (8). Sodium bicarbonate was injected in the bypass secondary stream (6) at injection point (3). The bypass secondary stream (6) was reintroduced in the main stream at the downstream reintroduction point (7), where the temperature of the main stream was 110° C.

The duct (5) comprised a 90° angle part (4), functioning as turbulence promoter of the bypass secondary stream (6). This angle part (4) improved the mixing of the sodium bicarbonate in the bypass secondary stream (6). It was additionally designed to impart flow resistance to limit the value of the flow rate of the bypass secondary stream (6).

In order to evaluate the performance of the gas cleaning, three parameters were used:

$SR_T$, which means <<total stoichiometric ratio>>. It is calculated by dividing the effective sodium bicarbonate flow rate by the theoretical sodium bicarbonate flow rate, based on stoichiometry, necessary to neutralize all the acids presents in the gas to be cleaned $$SR_T = \frac{F}{\sum_i (FXie \cdot \beta i)}$$

$SR_A$, which means <<achieved stoichiometric ratio>> It is calculated by dividing the effective sodium bicarbonate flow rate by the theoretical sodium bicarbonate flow rate, based on stoichiometry, necessary to achieve the observed neutralization of the acids presents in the gas to be cleaned $$SR_A = \frac{F}{\sum_i ((FXie - FXis) \cdot \beta i)}$$

wherein:
F=Effective sodium bicarbonate flow rate [kg/h]
FXie=Flow rate of acid Xi in the gas to be cleaned [kg/h]
FXis=Flow rate of acid Xi in the cleaned gas [kg/h]
βi=Sodium bicarbonate weight necessary to neutralize (stoichiometry) 1 kg of acid Xi [kg/kg]
C, which stands for global cleaning:

$$C = \frac{\sum_i (FXie - FXis) \cdot \beta_i}{\sum_i (FXie \cdot \beta_i)}$$

In the particular case of $SO_2$ as noxious acid compound and sodium bicarbonate as basic sodium reagent, we have $$2NaHCO_3 + SO_2 + \tfrac{1}{2}O_2 \rightarrow Na_2SO_4 + H_2O + 2CO_2$$

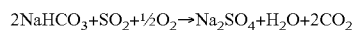

$$SR_T = \frac{FBicar}{FSO_2e \cdot 2.62}$$

$$SR_A = \frac{FBicar}{(FSO_2e - FSO_2s) \cdot 2.62}$$

$F\,Bicar$ = Effective sodium bicarbonate flow rate [kg/h]

$FSO_2e$ = Effective flow rate of $SO_2$ before cleaning [kg/h]

$FSO_2s$ = Effective flow rate of $SO_2$ after cleaning [kg/h]

Example 1

In example 1, a quantity of 156 kg/h of sodium bicarbonate powder whose particle size was characterized as follows:

| | |
|---|---|
| $d_{90}$ | 24 μm |
| $d_{50}$ | 10 μm |
| $d_{10}$ | 2 μm | was injected in the flue gas.

The global cleaning, $RS_T$ and $RS_A$ values and amount of $SO_2$ at the output of the cleaning ($FSO_2s$ in the chimney) which were observed are given in table 1.

Example 2

In example 2, a quantity of 251 kg/h of sodium bicarbonate powder whose particle size was characterized as follows:

| | |
|---|---|
| $d_{90}$ | 24 μm |
| $d_{50}$ | 9 μm |
| $d_{10}$ | 2 μm | was injected in the flue gas.

The global cleaning, $RS_T$ and $RS_A$ values and amount of $SO_2$ at the output of the cleaning ($FSO_2s$ in the chimney) which were observed are given in table 1.

Example 3

In example 3, a quantity of 251 kg/h of sodium bicarbonate powder whose particle size was characterized as follows:

| | |
|---|---|
| $d_{90}$ | 25 μm |
| $d_{50}$ | 10 μm |
| $d_{10}$ | 2 μm | was injected in the flue gas.

The global cleaning, $SR_T$ and $SR_A$ values and amount of $SO_2$ at the output of the cleaning ($FSO_2s$ in the chimney) which were observed are given in table 1.

Before each of the three examples, measurements of $FSO_2s$ in the chimney were performed in the absence of sodium bicarbonate injection. These measurements are labelled comparative examples 1 to 3.

TABLE 1

| Example | F Bicar [kg/h] | FSO₂s [mg/Nm³] | SO₂ Cleaning [mg/Nm³/ kg/h bicar] | Flue gas flow rate [Nm³/h] | Global cleaning C [%] | $SR_T$ | $SR_A$ |
|---|---|---|---|---|---|---|---|
| Comp. 1 | 0 | 1,221 | 0 | 117,000 | 0 | — | — |
| 1 | 156 | 1,005 | 1.27 | 117,000 | 17 | 0.45 | 2.5 |
| Comp. 2 | 0 | 1,187 | 0 | 117,000 | 0 | — | — |
| 2 | 251 | 799 | 1.55 | 117,000 | 33 | 0.93 | 3.2 |
| Comp. 3 | 0 | 1,265 | 0 | 117,000 | 0 | — | — |
| 3 | 251 | 517 | 3.00 | 117,000 | 59 | 0.63 | 1.1 |

A quantity of prereacted sodium bicarbonate was taken out of the partially cleaned secondary stream, just before being reintroduced into the main stream, and analysed. The results are given in table 2. It shows that the sodium bicarbonate has already absorbed a significant proportion of $SO_2$, as evidenced by the amount of $Na_2SO_4$:

TABLE 2

| $Na_2CO_3$ | 758 g/kg |
|---|---|
| $NaHCO_3$ | 11 g/kg |
| Ca given as $CaCO_3$ | 12 g/kg |
| K given as KCl | 17 g/kg |
| $Na_2SO_4$ | 169 g/kg |
| Total | 966 g/kg |
| Others | 34 g/kg |

The process according to the invention allows achieving global cleanings of at least 15%, in particular at least 30%, generally at least 40%, often at least 50% and in some instances at least 60%.

It is particularly suitable for the cleaning of flue gas comprising $SO_2$ and/or $SO_3$, in particular when produced by a cement production process.

The invention claimed is:

1. A two-step process for the cleaning of a stream of flue gas, containing noxious acidic compounds, by means of a quantity of basic sodium reagent, wherein
    the flow path of the stream of flue gas comprises a bypass point and a reintroduction point;
    the stream of the flue gas is separated at the bypass point into a bypass secondary flue gas stream and a main flue gas stream, the secondary stream being at most 50% in weight of the main stream;
    at least part of the quantity of basic sodium reagent is injected in the bypass secondary stream wherein it reacts in a first step with the noxious acidic compounds contained in the bypass secondary stream during a pre-reaction period, resulting in pre-reacted basic reagent, un-reacted basic reagent and partially cleaned secondary stream of flue gas;
    the temperature of the bypass secondary flue gas stream at the basic sodium reagent injection point is at least 50° C. higher than the temperature of the main flue gas stream at the reintroduction point;
    after the pre-reaction period, the partially cleaned secondary stream comprising the quantity of pre reacted basic sodium reagent and un-reacted reagent is reintroduced in the main flue gas stream at the reintroduction point, the pre-reacted reagent and un-reacted reagent then further reacting in a second step with at least part of the noxious acidic compounds contained in the main stream of the flue gas and at least part of the noxious acidic compounds left in the partially cleaned secondary stream of flue gas, resulting in reacted reagent and cleaned flue gas.

2. The two-step process for the cleaning of a stream of flue gas according to claim 1 wherein the reacted reagent is separated from the cleaned flue gas.

3. The two-step process for the cleaning of a stream of flue gas according to claim 1 wherein the temperature of the bypass secondary flue gas stream at the basic sodium reagent injection point is at least 75° C. higher than the temperature of the main flue gas stream at the reintroduction point.

4. The two-step process for the cleaning of a stream of flue gas according to claim 1 wherein the temperature of the bypass secondary flue gas stream at the basic sodium reagent injection point is at least 100° C. higher than the temperature of the main flue gas stream at the reintroduction point.

5. The two-step process for the cleaning of a stream of flue gas according to claim 1 wherein the basic sodium reagent is selected from the group consisting of sodium bicarbonate and sodium sesquicarbonate.

6. The two-step process for the cleaning of a stream of flue gas according to claim 1 wherein the bypass secondary flue gas stream circulates in a duct comprising a turbulence promoter.

7. The two-step process for the cleaning of a stream of flue gas according to claim 1 wherein the basic sodium reagent is sodium bicarbonate and wherein the temperature of the main flue gas stream at the reintroduction point is lower than 140° C.

8. The two-step process for the cleaning of a stream of flue gas according to claim 1 wherein the basic sodium reagent is a powder of particles having $D_{90}$ diameters less than 20 μm.

9. The two-step process for the cleaning of a stream of flue gas according to claim 8 wherein the basic sodium reagent is a powder of particles having mean $D_m$ diameters less than 15 μm.

10. The two-step process for the cleaning of a stream of flue gas according to claim 1 wherein the basic sodium reagent is a powder of particles having a particle size slope of less than 5.

11. The two-step process for the cleaning of a stream of flue gas according to claim 1 wherein the flue gas comprises $SO_2$ and/or $SO_3$ originating from a cement production process.

* * * * *